J. R. FLANNERY AND E. I. DODDS.
STAYBOLT.
APPLICATION FILED JULY 29, 1919.
1,342,162.
Patented June 1, 1920.
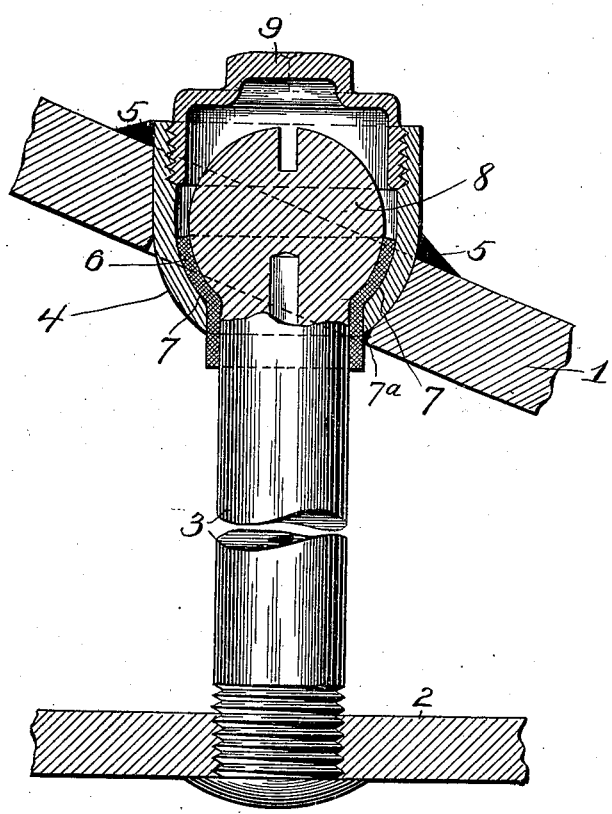
INVENTORS
J. R. Flannery and
E. I. Dodds
By Seymour & Bright  Attorneys

UNITED STATES PATENT OFFICE.

JOHN ROGERS FLANNERY AND ETHAN I. DODDS, OF PITTSBURGH, PENNSYLVANIA, ASSIGNORS TO FLANNERY BOLT COMPANY, OF PITTSBURGH, PENNSYLVANIA.

STAYBOLT.

1,342,162.	Specification of Letters Patent.	Patented June 1, 1920.

Application filed July 29, 1919. Serial No. 314,084.

*To all whom it may concern:*

Be it known that we, JOHN ROGERS FLANNERY and ETHAN I. DODDS, citizens of the United States, and residents of Pittsburgh, in the county of Allegheny and State of Pennsylvania, have invented certain new and useful Improvements in Staybolts; and we do hereby declare the following to be a full, clear, and exact description of the invention, such as will enable others skilled in the art to which it appertains to make and use the same.

This invention relates to an improvement in the staybolts for boilers,—the object being to provide, at the time of installation of the bolt, for clearance between the bolt and the sleeve carrying the bolt head and also with the wall of the bolt hole through the outer sheet.

A further object is to provide means whereby the sleeve or bushing constituting the seat for the head of the stay may be properly and accurately alined with the bolt opening in the inner sheet and sufficient clearance left between the bolt and the inner edge of the wall of the bolt opening in the outer sheet for the movements of the bolt during the expansion and contraction of the two sheets.

With these ends in view our invention consists in a boiler sheet having an opening therein, a sleeve or bushing seated in said opening and secured to sheet, and a destructible spacing member within the sleeve or bushing and forming a seat for the head of the bolt, the said spacing member projecting below the inner edge of the wall of the bolt hole so as to provide for clearance between said edge and the bolt.

The accompanying drawing is a view in section of the outer sheet of a boiler showing our improvement applied thereto.

1 represents the outer sheet of the boiler, 2 the inner sheet and 3 the bolt flexibly supported in the outer sheet and threaded in the inner sheet, the inner end of the bolt being upset. The outer sheet 1 is provided with a hole to receive the sleeve or bushing 4 which latter is cylindrical at its outer or upper end, and rounded or semi-spherical at its lower end, the bolt opening in said rounded end being of slightly greater diameter than the shank of the bolt so as to permit of the free movement of the latter, due to the unequal expansion of the sheets 1 and 2.

The opening in sheet 2 is of a size and shape to receive the sleeve or bushing 4 and forms a firm support for the same, and at the same time permits of the adjustment of the sleeve or bushing therein to properly aline with the bolt hole in sheet 2, and after the sleeve has been properly placed and seated, it is permanently secured to the outer sheet by welding as at 5.

In installing the bolt and its bushing we place a spacing member or lining 6 on the curved seat 7 of the sleeve 4 for the head of the bolt to rest upon, and extend this spacing member through the hole in the sleeve and outer sheet and preferably to a point below the plane of the lower edge of the wall of the bolt opening, so that in assembling the parts the neck or shank of the bolt will be removed from the edge 7 of the wall of the opening, at least the thickness of the lining. In locations where the outer sheet 1 is oblique to the bolt as shown, the edge 7 of the wall of the bolt opening at the apex of the acute angle formed by the outer sheet and the bolt, will unless care be taken in the assembling of the parts, obstruct the movement of the bolt toward the point 7ª, or the movement of said point 7ª toward the bolt, hence in order to provide for clearance at this point, and to prevent the assembling of the parts without such clearance, we extend the lining 6 inwardly below the inner surface of the outer sheet so that when the parts have been assembled, and the bolt secured to the two sheets, ample clearance will be left for movement after said lining has been dissolved or disintegrated. This lining 6 may be composed of any material soluble in water or steam that will act as a spacer during the assembling of the parts, or which will be softened and disintegrated by the water or steam, or by the latter and the grinding action to which it will be subjected by the head of the bolt when the sheets are heated and subjected to the pressure of the steam in the boiler.

The head 8 of the bolt 3 is covered and the outer end of the sleeve closed by the screw cap 9 screwed to the internally threaded outer end of the sleeve.

Having fully described our invention what we claim as new and desire to secure by Letters-Patent, is:—

1. In a staybolt structure, the combination of inner and outer sheets, a sleeve secured to the outer sheet and having a curved seat, a flexible stay bolt the head of which is mounted in the sleeve, and a destructible spacing member between said head and the lower opening in the sleeve.

2. In a staybolt structure, the combination of inner and outer sheets of a boiler, the outer sheet having a recessed seat for a sleeve, a sleeve mounted in said recessed seat and secured therein by welding, a flexible stay bolt the head of which is flexibly supported in the sleeve and a destructible spacing member between said head and neck of the bolt and the lower opening in the sleeve.

3. In a staybolt structure, the combination of inner and outer sheets of a boiler, a sleeve secured to the outer sheet and having a curved seat, a flexible stay bolt the head of which is mounted in the sleeve, a destructible spacing member between the said head and neck of the bolt and the lower opening in the sleeve, and a screw cap for closing the outer end of the sleeve.

In testimony whereof, we have signed this specification in the presence of two subscribing witnesses.

JOHN ROGERS FLANNERY.
ETHAN I. DODDS.

Witnesses:
JAMES R. HORAN,
EDWIN S. RYCE.